United States Patent [19]
Lagrange et al.

[11] 3,890,400
[45] June 17, 1975

[54] PROCESS FOR SELECTIVELY HYDROGENATING CYCLIC OLIGOMERS OF BUTADIENE

[75] Inventors: Yvon Lagrange, La Garenne Colombes; Germain Martino, Poissy; Christian Lassau, Chavenay, all of France

[73] Assignee: Institut Francais du Petrole des Carburants et Lubrifiants, Rueil Malmaison, France

[22] Filed: Feb. 21, 1973

[21] Appl. No.: 334,454

[30] Foreign Application Priority Data
Feb. 24, 1972 France .............................. 72.06406

[52] U.S. Cl. .......................................... 260/666 A
[51] Int. Cl. .............................................. C07c 5/02
[58] Field of Search ................................. 260/666 A

[56] References Cited
UNITED STATES PATENTS
3,692,864  9/1972  White ............................ 260/666 A Primary Examiner—Veronica O'Keefe
Attorney, Agent, or Firm—Millen, Raptes & White

[57] ABSTRACT 1,5-cyclooctadiene and 1,5,9-cyclododecatriene are selectively hydrogenated to cyclooctene and cyclododecene respectively by using a catalyst which comprises an iron salt, an organometallic compound and a phosphine.

9 Claims, No Drawings

PROCESS FOR SELECTIVELY HYDROGENATING CYCLIC OLIGOMERS OF BUTADIENE

This invention concerns a new process for manufacturing partially hydrogenated derivatives of the non-conjugated cyclic oligomers of butadiene :by way of example, the manufacture of cyclooctene from 1,5-cyclooctadiene and of cyclododecene from 1,5,9-cyclododectriene may be mentioned.

The use of Ziegler catalysts for hydrogenating olefins in homogenous phase was known since about 10 years, but it appears from the teaching of the French Patent No. 1,390, 570 that their hydrogenating activity is not at all selective with respect to polymers and particularly cyclododecatriene.

Processes of selective homogeneous hydrogenation have been known later and these processes mainly relate to the hydrogenation of polymers containing conjugated double bonds.

The processes used in the latter case cannot be used for the selective hydrogenation of compounds containing two or more non-conjugated ethylenic bonds; only recently, methods have been disclosed, which may be applied for example, to 1,5,9-cyclododecatriene.

Most of these methods make use of cobalt carbonyl complexes as catalysts, so that they suffer from a number of limitations.

As disclosed in the French Pat. No. 2,043,657, the amount of catalyst is very high and a pressure of carbon monoxide must be applied to avoid the catalyst deactivation. This has for main drawback, the production of hydroformylation products in substantial amounts and the dangers resulting from the handling of carbon monoxide.

The present invention avoids these drawbacks, as will be shown hereinafter, and has for object to disclose an inexpensive process for obtaining cyclic monoolefins at degrees of permitting their use, after withdrawal of the catalyst but without any other particular treatment, for further conversions such as polymerization, epoxidation, hydration and oxidation.

A second object of this invention is to provide inexpensive catalysts having a high selective hydrogenating activity with respect to 1,5-cyclooctadiene and 1,5,9-cyclododecatriene, these catalysts being soluble in saturated or unsaturated hydrocarbons.

The catalysts which are used according to this invention comprise an iron salt, an organometallic reducing compound and a phosphine. Unexpectedly the catalyst resulting from the mixing of these three components is selective, inasmuch as the catalysts obtained by reacting organoaluminic reducing compounds with iron salts (in the absence of phosphine) have not this selectivity.

Iron halides or alcoholates and iron salts of carboxylic acids of preferably 1–20 carbon atoms, for example octanoic, ethyl-hexanoic, stearic and naphthenic acids, are examples of iron salts.

The preferred reducing agents have the general formula M $R_1R_2R_3$ in which M is an aluminum or boron atom and the radicals $R_1$ to $R_3$ are each a hydrogen atom or a monovalent hydrocarbon radical of preferably 1–20 carbon atoms.

Triethylaluminum, triisobutylaluminum and diisobutylaluminum are examples of such compounds. Compounds such as cohydrides of aluminum and sodium or lithium may also be used. M is preferably aluminum.

The phosphine has preferably the formula P $R_4R_5R_6$, in which the radicals $R_4$ to $R_6$ are monovalent hydrocarbon radicals, either identical to or different from one another and consist for example of triphenylphosphine, triethylphosphine, tricyclohexylphosphine, ethyldiphenyl phosphine and diethylphenylphosphine. There may also be used diphosphines, e.g bis(diphenylphosphinoethane) or diphosphines of the formula $(R)_2P — A — P(R)_2$ in which R is a monovalent hydrocarbon radical of 1-20 carbon atoms and A is a direct bond or a divalent hydrocarbon radical of, for example, 1–6 carbon atoms.

The catalyst may be prepared in a hydrocarbon solvent, for example an aliphatic, cyclanic or aromatic hydrocarbon, or preferably in the reactants, i.e. 1,5-cyclooctadiene or 1,5,9-cyclododecatriene, or in the reaction products, i.e. cyclooctene or cyclododecene, by reacting the 3 components of the catalyst at temperatures of from 0° to 250°C and preferably 30° to 200°C.

The phosphine may be used in an amount of, for example, 0.5–5 moles, preferably 1–2 moles, per gram-atom of iron.

It may be used in admixture with the metal salt or the reducing compound, or directly introduced into the feedstock. The first two modes of introduction are preferred.

The molar ratio of the iron compound to the reactant may range, for example, from 0.0001 : 1 to 0.1 : 1 and preferably from 0.001 : 1 to 0.02 : 1; the ratio by volume of the catalytic solution to the feedstock may vary broadly, for example from 1:500 to 1:10 and preferably from 1:200 to 1:50.

The molar ratio of the organometallic reducing compound to the iron compound is desirably from 1:1 to 10:1 and preferably from 3:1 to 5:1.

The hydrogenation is conducted under mild conditions. Thus the reaction proceeds quickly at 60°–250°C, preferably 130°–200°C, at hydrogen pressures of 1–200 atmospheres, preferably 10–60 atmospheres. At temperatures below 60°C, the reaction proceeds too slowly and at temperatures above 250°C, cracking of the product may take place.

Any trace of catalyst in the hydrogenation effluent may be eliminated by percolation through a finely crushed substance; a further fractionation being unnecessary. It is thus possible to make use of acidic, neutral or basic alumina, silica, kieselguhr, active carbon, bleaching earth, flying ash, bauxite or other equivalent adsorption agents in powder form.

The percolation temperature is preferably in the range of from −20°C to 200°C, and the inlet pressure is preferably 1–150 atmospheres.

The optimal temperature will be selected in each particular case according to the selected adsorbent, so as to avoid the cracking of the product which might otherwise occur in some cases.

The hydrogenation may be carried out batchwise or continuously and, in the latter case, in one or more reactors with or without recycling a fraction of the effluent.

A gradient column is particularly useful when selectively hydrogenating such compounds as hereinbefore defined. An up-flow or a down-flow of liquid phase may be used. Hydrogen may circulate in co-current or counter-current.

The examples 1–12 illustrate the invention but are not to be considered as limiting the same in any respect; the examples 1 a and 4a are given only by way of comparison and form no part of the invention.

EXAMPLE 1

100 cc of 1,5-cyclooctadiene (1,5-COD) are charged with hydrogen in an autoclave of 250 cc. The mixture is heated up to 80°C and 2 cc of a catalytic solution containing 0.3 millimol of iron octoate, 1.2 millimole of triethylaluminum and 0.3 millimole of triphenylphosphine are added thereto. The pressure is raised to 20 atmospheres by means of additional hydrogen. After one hour of reaction, the composition by weight of the effluent is the following : 9.5 % of 1,3-cyclooctadiene (1,3-COD), 69 % of cyclooctene (COE) and 21.5% of cyclooctane (COA).

EXAMPLE 1a

Example 1 is repeated, except that no phosphine is used. After one minute, the effluent contained 42.5 % of 1,3-cyclooctadiene, 20 % of cyclooctene and 37.5 % of cyclooctane. After 2 minutes their respective contents were 4 %, 20 % and 76 %.

EXAMPLES 2 and 3

Example 1 is repeated, except that various conditions are changed. The ratio of the number of moles of ligand to the number of gram-atoms of iron is varied by adjusting the amount of ligand with respect to an unchanged amount of iron octoate.

The results of the anlysis of the effluents is given in table I.

TABLE I

| Example | PHosphine | Moles of phosphine per gram-atom of iron | Time hours | T° °C | 1,5-COD % by weight | 1,4-COD % by weight | 1,3-COD % by weight | COE % by weight | COA % by weight |
|---|---|---|---|---|---|---|---|---|---|
| 2 | TPP | 2:1 | 3 | 80 | 0 | 0 | 9 | 82 | 9 |
| 3 | TPP | 2:1 | 3 | 130 | 0 | 0 | 2 | 78 | 20 |

TPP = triphenylphosphine

EXAMPLE 4

100 cc of 1,5,9-cyclododecatriene and hydrogen are introduced into an autoclave of 100 cc, and the temperature is raised up to 160°C. 2 cc of a catalytic solution containing 0.7 millimole of iron stearate, 3 millimoles of triethylaluminum and 0.63 millimole of triphenylphosphine are added thereto. The pressure is raised to 30 atmospheres by means of hydrogen. After 1 hour, the reaction is stopped and the resulting product has the following composition by weight: 26 % of cyclododecane (CDA), 73 % of cyclododecene (CDE), 1% of 1,5,9-cyclododecatriene (CDT) + dienes.

EXAMPLE 4a

Example 4 is repeated, except that no phosphine is used. After 2 minutes the effluent contains 45 % of cyclododecane, 54 % of cyclododecene and 1 % of a mixture of cyclododecatriene and dienes.

EXAMPLES 5 – 12

Example 4 is repeated except that the amount of triphenylphosphine is varied or other phosphines are used. The conditions, when differing from those of example 4, and the analysis of the effluents, are given in table II.

TABLE II

| Example | Phosphine | Moles of phosphine per gram-atom of iron | Time hours | CDA | CDE | CDT + dienes |
|---|---|---|---|---|---|---|
| 5 | TPP | 1 | 2 | 18 | 80,5 | 0,5 |
| 6 | " | 1,5 | 4 | 14 | 85,2 | 0,8 |
| 7 | " | 1,5 | 5 | 18 | 82 | <0,1 |
| 8 | " | 2 | 7 | 11 | 88,7 | 0,3 |
| 9 | " | 2 | 7 | 12 | 87,8 | <0,2 |
| 10 | PEt($C_6H_5$)$_2$ | 2 | 6 | 13,5 | 86,2 | 0,3 |
| 11 | PCy$_3$ | 2 | 4,5 | 19 | 80,5 | 0,5 |
| 12 | DPE | 1 | 2 | 16 | 83,5 | 0,5 |

TPP = triphrenylphosphine
DPE = bis(diphenylphosphino)ethane
PCy$_3$ = tricyclohexylphosphine

What we claim is:

1. A process for selectively and catalytically hydrogenating in liquid phase an unsaturated cyclic oligomer of butadiene selected from the group consisting of 1,5-cyclooctadiene and 1,5,9-cyclododecatriene, which comprises reacting said unsaturated oligomer with hydrogen at a temperature of from 60° to 250°C, in contact with a catalytic quantity of a reaction mixture produced by the single step of reacting at 0°–250°C:
   a. an iron compound selected from the group consisting of iron halide, iron alcoholate and an iron salt of a carboxylic acid of 1–20 carbon atoms,
   b. an organometallic reducing compound of the formula M $R_1R_2R_3$ in which M is aluminum or boron and each of $R_1$, $R_2$ and $R_3$ is a hydrogen atom or a monovalent hydrocarbon radical, and
   c. a phosphine of the formulae P $R_4R_5R_6$ or $(R)_2$P-A-P$(R)_2$ wherein $R_4R_5$ and $R_6$ are monovalent hydrocarbon radicals, R is a monovalent hydrocarbon radical of 1–20 carbon atoms, and A is a direct bond or a divalent hydrocarbon radical of 1–6 carbon atoms.

2. A process according to claim 1, wherein the phosphine has the formula P $R_4R_5R_6$ in which each of $R_4$, $R_5$ and $R_6$ is a monovalent hydrocarbon radical.

3. A process according to claim 1, wherein the phosphine is triphenylphosphine.

4. A process according to claim 1, wherein the temperature is 130–200°C and the pressure 1–200 atmospheres.

5. A process according to claim 1, wherein the iron compound is soluble in the cyclic oligomer to be hydrogenated.

6. A process according to claim 1, wherein the molar ratio of the iron compound to the oligomer is from 0.0001:1 to 0.1:1 ; the phosphine: iron ratio is 0.5-5 mols phosphine per atom of iron; and the molar ratio of the organometallic compound to the iron compound is 1:1 to 10:1.

7. A process as defined by claim 1, wherein the iron compound is said iron salt of a carboxylic acid of 1–20 carbon atoms.

8. A process as defined by claim 4, wherein the iron compound is said iron salt of a carboxylic acid of 1–20 carbon atoms.

9. A process according to claim 8, wherein the molar ratio of the iron compound to the oligomer is from 0.0001:1 to 0.1:1; the phosphine:iron ratio is 0.5–5 mols phosphine per atom of iron; and the molar ratio of the organometallic compound to the iron compound is 1:1 to 10:1.

* * * * *